US006612519B1

(12) United States Patent
Becherucci et al.

(10) Patent No.: US 6,612,519 B1
(45) Date of Patent: Sep. 2, 2003

(54) METHODS AND APPARATUS FOR WINDING ELECTRIC MACHINE CORES

(75) Inventors: Raffaele Becherucci, Florence (IT); Gianfranco Stratico, Siena (IT); Maurizio Mugelli, San Gimignano (IT); Giovanni Manuelli, Florence (IT)

(73) Assignee: Axis USA, Inc., Tampa, FL (US)

( * ) Notice: Subject to any disclaimer, the term of this patent is extended or adjusted under 35 U.S.C. 154(b) by 27 days.

(21) Appl. No.: 09/699,184

(22) Filed: Oct. 27, 2000

Related U.S. Application Data

(60) Provisional application No. 60/163,102, filed on Nov. 2, 1999.

(51) Int. Cl.[7] .................. H02K 15/085; H02K 15/09
(52) U.S. Cl. ................. 242/432.6; 242/433.3; 242/433.4; 29/596
(58) Field of Search .............. 242/433.3, 433.4, 242/432.6; 29/596

(56) References Cited

U.S. PATENT DOCUMENTS

| 3,911,563 | A | | 10/1975 | Anderson | |
|---|---|---|---|---|---|
| 3,927,456 | A | | 12/1975 | Dammar | |
| 4,087,054 | A | | 5/1978 | Finegold | |
| 4,616,788 | A | | 10/1986 | Finegold | |
| 4,768,727 | A | | 9/1988 | Santandrea et al. | |
| 4,775,309 | A | | 10/1988 | Hehl | |
| 4,817,256 | A | * | 4/1989 | Riti et al. ................ | 242/433.4 |
| 4,997,155 | A | | 3/1991 | Reuter et al. | |
| 5,127,594 | A | | 7/1992 | Lombardi et al. | |
| 5,253,912 | A | | 10/1993 | Andorlini et al. | |
| 5,257,744 | A | | 11/1993 | Lombardi et al. | |
| 5,257,745 | A | | 11/1993 | Lombardi et al. | |
| 5,335,868 | A | * | 8/1994 | Iwase ...................... | 242/433.3 |
| 5,370,324 | A | * | 12/1994 | Beakes et al. ........... | 242/432.4 |
| 5,391,070 | A | | 2/1995 | Ito et al. | |
| 5,484,976 | A | | 1/1996 | Sbalchiero et al. | |
| 5,494,230 | A | | 2/1996 | Doglas | |
| 5,653,014 | A | * | 8/1997 | Faraoni et al. ........... | 198/346.1 |
| 5,774,963 | A | * | 7/1998 | Bradfute et al. ......... | 198/346.2 |
| 5,799,896 | A | * | 9/1998 | Luciani et al. ........... | 242/433.3 |
| 5,813,541 | A | | 9/1998 | Mottram | |
| 5,829,572 | A | | 11/1998 | Faraoni et al. | |
| 5,909,988 | A | | 6/1999 | Hoppe et al. | |
| 6,145,773 | A | | 11/2000 | Stratico | |
| 2002/0020778 | A1 | * | 2/2002 | Stratico et al. .......... | 242/432.6 |

FOREIGN PATENT DOCUMENTS

| DK | 37 30 984 | 3/1988 |
|---|---|---|
| DK | 29 607 728 | 7/1996 |
| JP | 09 267 230 | 10/1997 |

* cited by examiner

Primary Examiner—Kathy Matecki
Assistant Examiner—Evan Langdon
(74) Attorney, Agent, or Firm—Fish & Neave; Robert W. Morris; George L. Kanabe

(57) ABSTRACT

The present invention discloses methods and apparatus for winding wire onto the slots on armature lamination stacks. More specifically, the present invention is directed to methods and apparatus for increasing time the winding components are operating on an armature winding system. The invention includes a loading/unloading unit and a holding unit that may be operated independently under most circumstances. The independent operation enables the winders of the present invention to operate at increased duty cycles, thereby increasing throughput. Additionally, the apparatus of the present invention increases the likelihood that armatures remain properly indexed during the loading transfer process to further increase system efficiency.

48 Claims, 5 Drawing Sheets

METHODS AND APPARATUS FOR WINDING ELECTRIC MACHINE CORES

CROSS REFERENCE TO RELATED APPLICATION

This application claims the benefit of U.S. provisional patent application No. 60/163,102, filed Nov. 2, 1999, which is hereby incorporated by reference in its entirety.

BACKGROUND OF THE INVENTION

The present invention is related to methods and apparatus for manufacturing dynamo-electric machines such as electric motors, generators, and similar apparatus. More specifically, the present invention relates to improved solutions for rapidly winding coils of wire on different sized cores of dynamo-electric machine using a mechanical winding machine.

Electric motors generally include two main components, a fixed portion and a rotating portion or "core." Often, the fixed portion is referred to as a "stator," while the rotating core portion is often referred to as the "armature." In these cases, the core typically includes a "rotor" that rotates inside the stator. The rotating core may be an armature that is typically formed from a stack of laminated pieces of iron or steel and has a series of slots spaced around its circumference onto which wire is wound. A commutator may be attached to the rotor that provides an electrical connection to the armature. The rotor and the commutator are mounted in an axially spaced relation on a common shaft.

The commutator is formed from a series of circumferentially spaced conductive bars that each may include a connection point such as a "tang" to which the starting and ending leads of the wound coils are physically and electrically connected. While tangs are a commonly available type of connection point, persons skilled in the art will appreciate that other types of connections are also available. For example, instead of a tang, a channel or slot within a solid commutator bar may be used in which wire leads are inserted into the channel and the channel is then sealed around the wire. In either case, electricity supplied to the wire induces a current which interacts with a magnetic field produced in the stator to create torque that causes the motor to rotate.

There are numerous known machines that are capable of winding wire onto the slotted lamination stack. These winding machines have at least one—and often two—wire applying devices known as "flyers" that rotate about an axis normal to that of the lamination stack. The flyers draw wire from a source and wind it around the slots to produce a wound coil having a desired number of turns. When a coil (or set of coils in the case of a double flyer machine) is completely wound, the flyers stop and the wire leads are brought next to the tangs or other connection points on the commutator to which they will be attached. The core is then rotationally indexed to present the tangs (or other connection points) to the wire hooking devices, and the flyer wraps wire around them. Rotational indexing also brings the next set of slots on the lamination stack into position to receive wire from the flyers.

Various examples of wire winding machines are described in, for example, Anderson U.S. Pat. No. 3,911,563, and in Lombardi et al. U.S. Pat. Nos. 5,127,594 and 5,257,745, all of which are commonly assigned with the present application. Each of the above identified patents are hereby incorporated by reference.

While such winders may be very effective for properly winding wire on the lamination stack slots, difficulties may arise when it is desired to wind wire around a core that does not have the same dimensions as the previously wound core. Currently available winding machines often require the center of each lamination stack to be aligned with a fixed axis on the machine. Moreover, two lamination stacks may have different centers even if they utilize a common sized shaft because, for example, the size of the lamination stack can also vary.

Additional difficulties also occur due to the multiple times a core is handled prior to winding. For example, one device may be used to form the core. This process includes selecting the proper number of laminations, stacking them on a rotor shaft, and fixing them in place. Then, a commutator must be added to complete the core. The completed core is then transferred to the winding machine, often with a known first index position (i.e., the first slot in the lamination stack to be wound). Problems may occur, however, during the transfer from the load/unload device to the gripper that holds the core in place during winding and that first index position may be lost. This causes a delay in the manufacturing process and may even require human intervention to insure that the core is properly indexed prior to winding.

Even if the first index position is not lost, known winding systems may be inherently slower than necessary due to other limitations. For example, in known winding systems, the winder must wait a given amount of time after a core is loaded for the load/unload device to move out of the way. This waiting time is directly proportional to the distance the load/unload device must travel to get out of the way. An additional delay is also inherent in that the winder must pause and wait while the loader/unloader travels that same distance prior to removing the wound core from the winder.

Conventional winding systems also typically are inherently inefficient as the winding flyers are idle for a large portion of each operational cycle. This is due to the way in which the cores are loaded and unloaded into the winding area. In known systems, a load/unload unit is utilized to remove wound cores and to place unwound cores into the winding area. Prior to and subsequent to each load/unload operation, the winding devices (including the flyers and winding guides) must be moved out of the way so that the load/unload unit may move inside the winding area to manipulate the cores. Due to the size of the typical load/unload unit, the time required for moving the winding systems out of and into position is relatively significant. The system cannot be winding while the winding systems are moving, resulting in inefficiency.

Further problems with conventional winding systems are the inherent problems in processing sequential cores which are different sizes. Each core must be aligned such that its center is co-located with the center of the flyers. The load/unload unit is often used to perform the alignment function as well. Unfortunately, this results in the load/unload unit being a substantially complex piece of equipment that requires a variable drive to accommodate different sized cores.

Additional problems also often occur in configuring automated winding systems. These problems are related to the fact that the systems, which typically include multiple hydraulic and/or air pressure lines, must be calibrated to run at specific operational pressures. Typical installations, however, often are configured such that the pressure controls, which are needed very infrequently after the initial baseline levels are set, are located in a hidden location such as underneath the operational console. While this may be convenient for normal operation, as well as being aesthetically pleasing, the conventional location of these controls often makes the initial setup very difficult, especially for a single operator. The operator simply cannot easily reach and adjust the controls while simultaneously observing the impact of those changes, due to the location of those controls.

In view of the foregoing, it is an object of this invention to provide methods and apparatus for transferring cores from a load/unload apparatus to a winding apparatus while retaining alignment of the lamination stack slots.

It also is an object of this invention to provide methods and apparatus for winding core coils in which the winding device is operational at an increased level of efficiency.

It is a further object of the present invention to provide methods and apparatus for simplifying sequential processing of different sized cores.

It is a still further object of the present invention to provide methods and apparatus for enabling an operator to adjust the initial pressure and other settings on the winding system while simultaneously being able to observe the impact of those adjustments.

SUMMARY OF THE INVENTION

These and other objects of the invention are accomplished in accordance with the principles of the invention by providing a novel transfer mechanism that minimizes the number of transfers of the core prior to winding. This significantly increases the likelihood that the indexing of the core will not be lost when the core is loaded into the winder, thereby enabling a more rapid winding process. An assembled, but unwound, core is grasped by a gripper of a load/unload device and oriented at a first index position. That position insures that a slot in the lamination stack will be in alignment with the winder when the core is placed into the winder. The core is then directly transferred to the holding gripper of the winder, while the first index position is maintained.

Another aspect of the present invention is related to the increase in efficiency of the winding system. This is related to the fact that the winding flyers are operational for a higher percentage of time than in conventional systems. The improvements in efficiency are obtained by increasing the capability of the equipment in the winding area and offloading functionality from the load/unload unit. In particular, the load/unload unit is limited to moving cores to and from a specific location that is outside of the winding area. Instead, the holding unit, which is located in the winding area, is provided with longitudinal movement capability and is tasked with the function of aligning the core with respect to the winders and winding guides, a task that was previously assigned to the load/unload unit. This provides multiple advantages.

One advantage results from the fact that the holding unit is much smaller than the load/unload unit, so that the winding systems do not have to be moved as far out of the way for load/unload operations. The less distance required for travel of the winding systems, the more time they may spend winding cores and the greater overall system efficiency. In addition, removing the alignment feature from the load/unload unit enables that unit to be significantly simpler because of the elimination of a variable drive. The present invention instead utilizes a fixed drive that may be implemented to simply move the load/unload unit from one fixed location to the next.

Further advantages of the present invention are obtained by the addition of longitudinal movement to the holding unit. In particular, because the holding unit and the load/unload unit are each moving toward the transfer point at the same time, they will necessarily meet at that point faster than in conventional systems. Accordingly, the transfer will occur sooner than in conventional systems and the alignment of the unwound core will also be accomplished faster. In this manner, the waiting time between each winding process is further reduced and the overall efficiency of the winding systems is increased.

Other features of the present invention are provided that increase the ease with which the system may be initially configured for normal operation. This process typically requires fine-tune adjustments of various pressure settings to insure that automated operation occurs smoothly. The present invention accomplishes this by relocating the pressure controls so that they are accessible to the operator while the operator is observing the operation of the system. This requires the controls, which are typically located in a hidden or isolated location because they are seldom used after the initial settings are made, to be within the reach of the operator during observation of the system, and preferably located in the back of the system (i.e., opposite to where the cores are loaded and unloaded).

Further features of the invention, its nature and various advantages will be more apparent from the accompanying drawings and the following detailed description of the preferred embodiments.

DETAILED DESCRIPTION OF EXEMPLARY EMBODIMENTS

Figure 1:
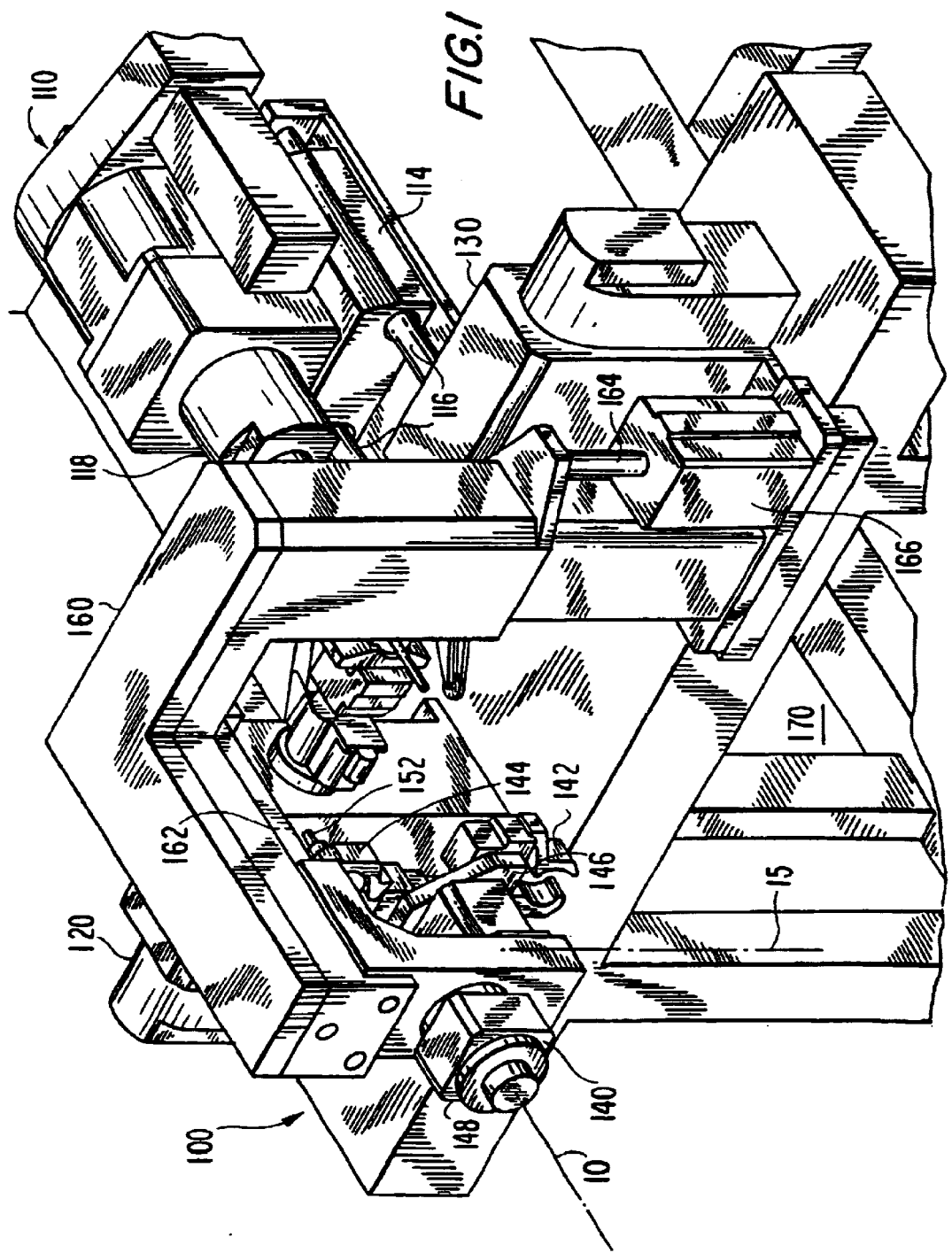
FIG. 1 is a three dimensional perspective view of a core winder constructed in accordance with the principles of the present invention.
Figure 2:
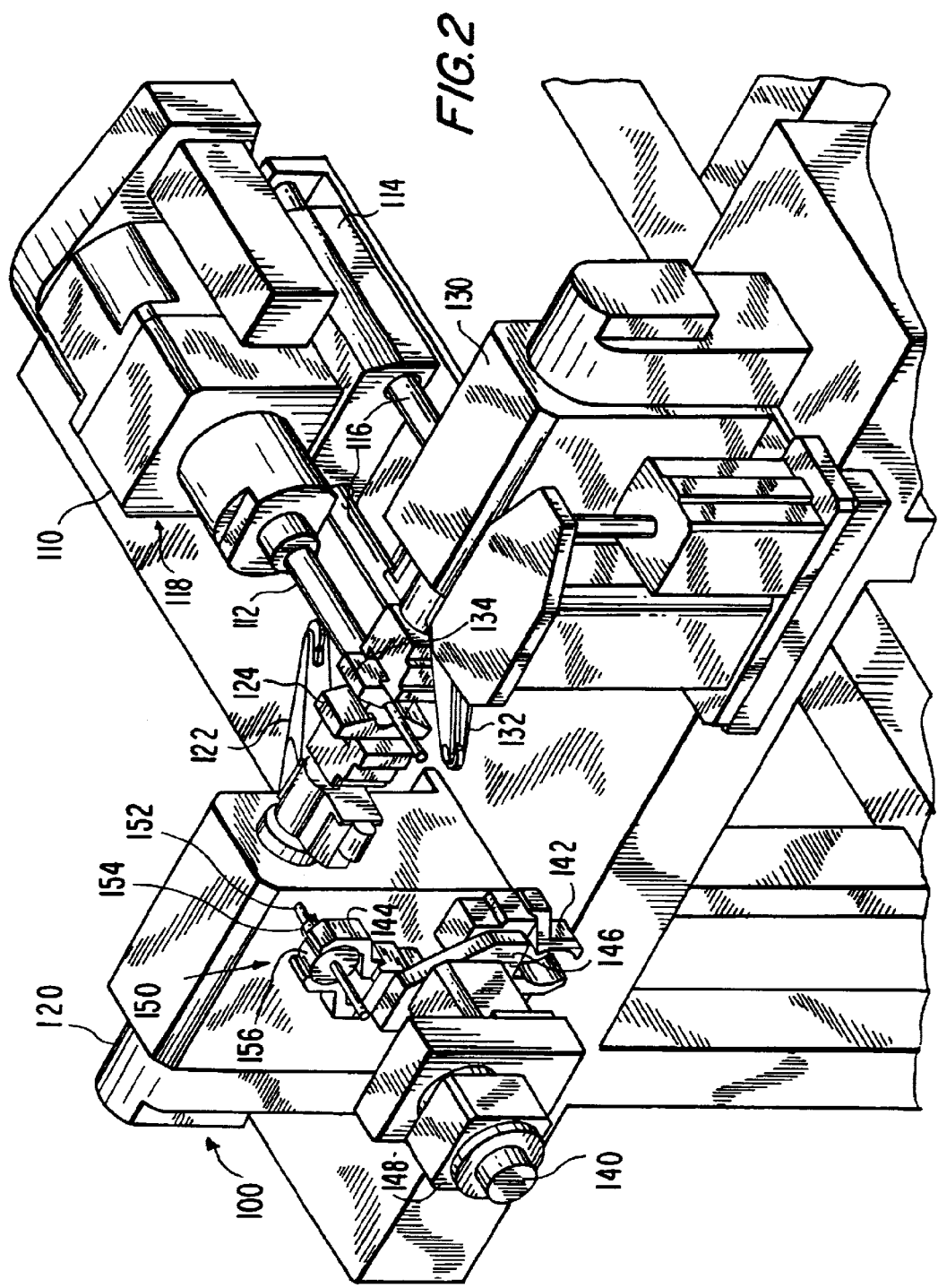
FIG. 2 is a three dimensional perspective view of the core winder of FIG. 1, in which certain elements are removed for purposes of illustration.

The drawings are provided to illustrate embodiments of the invention and not for purposes of limitation. FIGS. 1 and 2 show a core winding apparatus 100 (in FIG. 2, some of the supporting structure has been removed for purposes of illustrating various details of the present invention). Winding apparatus 100 includes several main components including holding unit 110, winding units 120 and 130, and load/unload unit 140. Winding apparatus 100 winds coils on completely assembled core 150. Cores 150 are preferably armatures, which may include shaft 152, commutator 154 and lamination stack 156, but persons skilled in the art will appreciate that the core may take on other functions, such as a stator in a brushless machine. Commutator 154 includes some form of connection between the appropriate wound coils and each commutator bar. This connection may be, for example, a tang or channel, or any other means for connecting the wound wire to the commutator bars as persons skilled in the art will appreciate.

Holding unit 110 includes gripper 112, which securely grasps and retains shaft 152 so that armature 150 does not rotate during winding operations. Holding unit 110 also includes variable drive unit 114, drive guides 116, and indexer 118. Drive unit 114 moves forward along guides 116 to grasp unwound armatures from load/unload unit 140, and then retracts along guides 116 so that the unwound armatures are placed into a properly aligned position for winding. Holding gripper 112 may be any known gripper such as the grippers described in commonly assigned U.S. Pat. No. 5,257,744 and U.S. patent application Ser. No. 09/323,304, both of which are herein incorporated by reference in their entirety.

One advantage of the present invention is obtained because holding unit 110 has a significantly smaller radius than gripper 112 extending from load/unload unit 140. The result of this size difference is that the winding units (see description below) do not have to move as great of a distance for the loading/unloading process. Accordingly, they may resume operation after a shorter wait time because they will be back in place sooner after each new core is cycled in place.

After each individual lamination stack slot has been wound, indexer 118 rotates armature 150 so that an unwound slot is placed into alignment with winding units 120 and 130. This process continues until each of the slots in the lamination stack have been wound. Once the core is completely wound, the system changes cores as is described in more detail below.

Winding units 120 and 130 each include a flyer 122, 132, and a winding guide 124, 134. Flyers 122 and 132 operate at high speed, in opposite directions, to wind the wire into the slots on lamination stack 156. Winding guides 124 and 134 act to force the wire into the intended slot on lamination stack 156. Persons skilled in the art will appreciate that the specific configuration of winding units 120 and 130 shown in FIGS. 1 and 2 is merely for purposes of illustration, and that various other winding units may be utilized without departing from the scope of the present invention.

Load/unload unit 140 includes a pair of core grippers 142 and 144 that are mounted to a command plate 146. The grippers may be, for example, like those described in commonly-assigned U.S. Pat. No. 5,253,912, which is incorporated herein by reference in its entirety. Lower gripper 142 is the gripper that is used to load and unload cores from holding unit 110, and accordingly, is aligned on the same axis as the center of holding unit 110. Command plate 146 may be rotated by motor-gear drive 148 about axis 10 as is described in more detail below. Load/unload unit 140 is supported by support structure 160, which includes drive guides 162 and 164, and drive 166. A drive (not shown— hidden by structure 160) drives load/unload unit 140 back and forth along guides 162 (and in parallel to axis 10), while drive 166 drives load/unload unit 140 vertically up and down along guide 164.

The up and down movement enables load/unload unit 140 to retrieve new, unwound, cores from a pallet (not shown) that may be part of a conveyor system (not shown), for example, and also enables the movement of wound cores to an empty pallet for downstream operation or for storage prior to moving on to the next station in the motor manufacturing cycle. In accordance with the principles of the present invention, these load/unload operations occur while the winding portion of the system is winding cores. Core grippers 142 and 144 may grip the core by the lamination stack using a pair of pliers, or any other convenient location on the core and, using an internal pawl (not shown), are able to establish the first index position for winding.

Operation of winding apparatus 100 may occur as follows, assuming that the system is already up and running (i.e., a core is already in the winding portion of the system being wound, gripper 144 has a wound core, and gripper 142 is empty having just transferred an unwound core to holding unit 110). Upstream from winding apparatus 100, cores 150 have previously been assembled. Each core may include a commutator 154 and a lamination stack 156, both of which are permanently mounted to a common shaft 152. Assembled cores 150 may, for example, be delivered to apparatus 100 via pallets (not shown) moving on a conveyor (not shown), in which case the pallet would be conveyed below apparatus 100 in the area generally designated as reference 170.

Drive 166 drives support structure 160 downward so that empty gripper 142 may grasp an unwound core 150 (the same movement is also used to return the wound cores 150 to a transport pallet for further processing). The internal pawl on gripper 142 may be utilized to align armature 150 in its first index position. Drive 166 moves support structure up and command plate 146 is rotated one hundred eighty degrees (180°) (rotation may occur prior to, during, or after vertical movement, without departing from the spirit of the present invention) so that the wound core is in the lower gripper. Drive 166 once again lowers the support structure so that the wound core may be placed on a transport pallet (not shown) for further processing. Finally, drive 166 moves structure 160 upward so that empty lower gripper 142 is aligned with axis 60 (see FIG. 3), and the load/unload unit is moved to its waiting position (i.e., position 64 in FIG. 3).

In this manner, lower gripper 142 becomes upper gripper 144, which now includes an unwound core ready to be loaded into the winding portion of the system, and lower gripper 142 remains empty. Up and down movement of structure 160 also may occur while winding units 120 and 130 are winding the next core, thereby further increasing the throughput and efficiency of winding apparatus 100. Load/unload unit 140 is moved longitudinally into position to wait for holding unit 110 to deliver a wound core as is described in more detail below. Once the core is wound, the wound core is transferred to empty lower gripper 142, command plate 146 is again rotated so that upper gripper 144 retains the wound core, and the unwound core is transferred to holding unit 110, which properly aligns the center of the core with the flyers prior to the next winding procedure.

Figure 3:
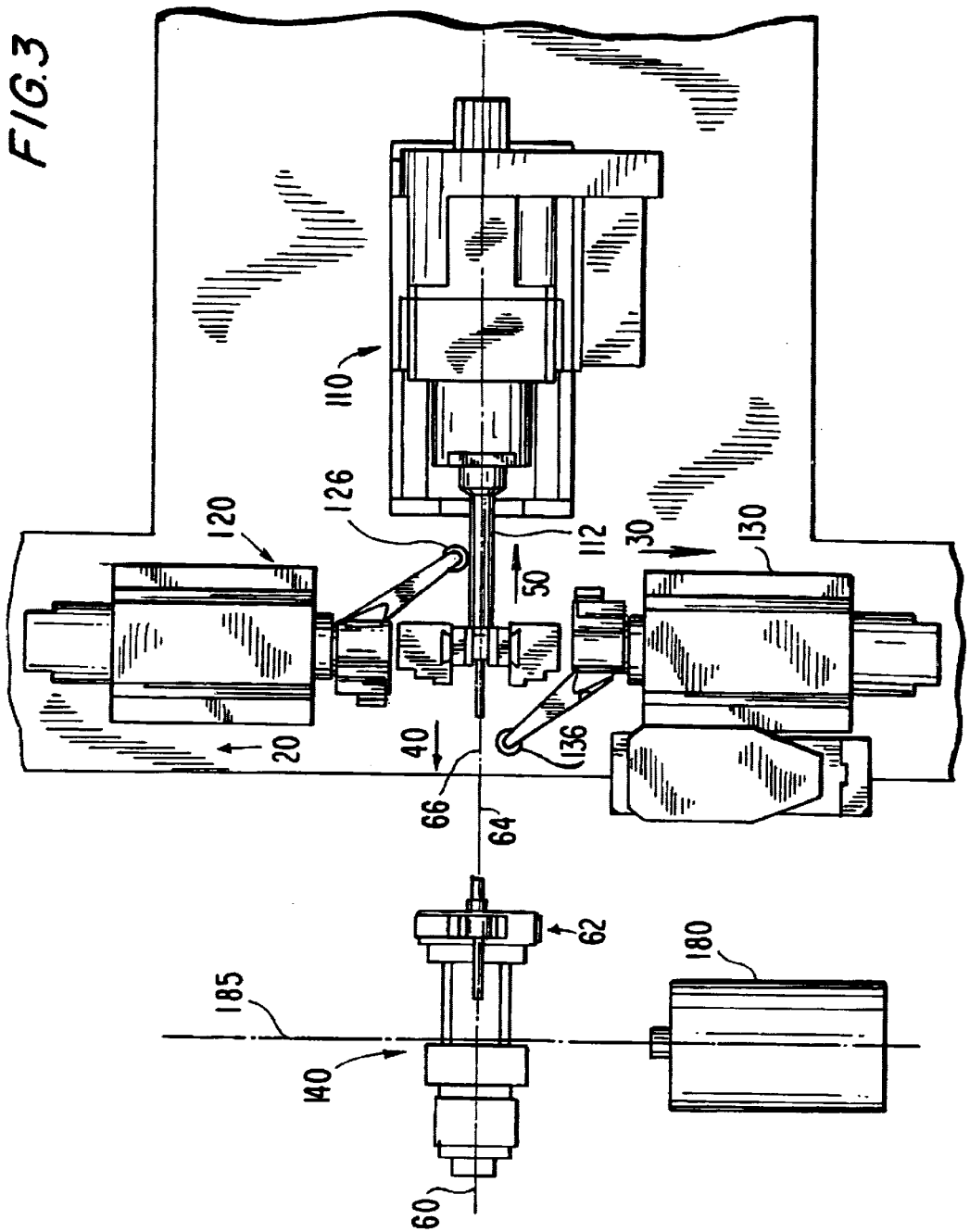
FIG. 3 is a plan view of the core winder of FIG. 1.

Further details of the advantages of the present invention are apparent from the illustration shown in FIG. 3. As seen in FIG. 3, the loading and unloading operation takes place along axis 60. Lower gripper 142 of load/unload unit 140 is the portion of unit 140 that is aligned along axis 60. Once an unwound core is loaded into upper gripper 144 (as described above), load/unload unit 140 is moved along axis 60 in direction 50 into position 64, where it waits. In position 64, there still is a small clearance space between unit 140 and winding units 120 and 130, but the distance required for core travel during loading and unloading is thus reduced in accordance with the present invention. Instead of the traditional distance, such as moving from position 62, through position 66 until the center of the core was aligned, load/unload unit only needs to move from position 64 to position 66 to accept a wound core from holding unit 110, which also moves along axis 60.

Moreover, as is plainly illustrated in FIG. 3, and because grippers 142 and 144 are likely to be required to grip the core by the stack instead of the shaft, the radius of load/unload unit 140 is substantially larger than the radius of gripper 112 extending from holding unit 110. If the load/unload unit also had to align the unwound core, the winding systems, including winding guides 124 and 134, and flyer wheels 126 and 136 would have to be moved substantially farther apart. This is particularly so with respect to the winding guides because their location, prior to being moved back, would prevent the load/unload unit gripper from being able to grasp the stack (if the load/unload unit provides the core indexed, than the load/unload unit gripper needs to be able to grip the stack instead of the shaft, and thus will necessarily have a larger radius). Accordingly, in known systems, the winding systems would therefore be driven further along directions 20 and 30, respectively. In conventional winding systems, this movement (in both directions) significantly reduces the time that the winding systems are available for winding operations.

In the present invention, however, load/unload unit 140 never enters the winding area of system 100, so that the distance that the winding systems travel during each unload and load operation is reduced to a minimal distance (i.e., the distance slightly greater than the diameter of the holding unit and the core in the holding unit, such that the core and holding unit can move along axis 60 without engaging any components of the winding systems, and specifically winding guides 124, 134). Thus, the reduced distance of travel results in the winding flyers being operational for a greater percentage of time than in conventional systems.

Another advantage of the present invention is obtained by offloading functionality from load/unload unit 140 to holding unit 110. The offloaded functionality is the alignment process whereby the center of the unwound core is aligned in the center of flyers 120 and 130. By moving that function to holding unit 110, the variable drive unit of conventional load/unload units may be replaced by a simpler drive unit that moves load/unload unit from one fixed location to another.

Moreover, while holding unit 110 is aligning the unwound core, load/unload unit 140 may be transferring the wound armature to fusing device 180 by rotating ninety degrees (90°) about axis 15 at position 62 so that the core is aligned parallel to axis 185 (the rotation may be accomplished through the use of a motor-gear drive, not shown, such as motor-gear drive 148 responsible for rotating command plate 146). It should be noted that, when transfer to fusing device 180 occurs, it is upper gripper 144 that retains the wound core while lower gripper 142 is empty. This enables the rotation of load/unload unit 140 to occur without requiring any rotation of command plate 146, and aligns the empty gripper with fusing device 180. The empty gripper is thus aligned to extract the fused core, at which point command plate 146 is rotated to move the wound core in alignment to be fused. After the wound core has been placed in fusing device 180, load/unload unit 140 returns to waiting position 64 to receive the next wound core from holding unit 110.

Persons skilled in the art will appreciate that, when apparatus 100 includes fusing device 180, each of grippers 142 and 144 should include the ability to index the core so that the index position can be easily transferred to fusing device 180. Fusing device 180 may be any known fusing apparatus, such as the fusing methods and apparatus shown and described in commonly assigned U.S. Pat. No. 5,484,976, which is incorporated herein by reference in its entirety. The fusing device fuses the ends of the wires to the tangs, slots or channels to which they are connected.

Further features of the present invention are obtained through the use of two grippers and rotary command plate 146. As described above, load/unload unit waits at position 64 while upper gripper 144 retains an unwound core and lower gripper 142 is empty. Once the core is wound, lower gripper 142 grips the wound core, command table 146 is rotated, and the unwound core is made available to holding unit 110. At this point in time, the wound core is in upper gripper 144 which, because it is located above all of the equipment of apparatus 100, and thus is out of the way of the entire winding apparatus, even if load/unload unit 140 is rotated parallel to axis 185 for alignment with fusing device 180, as described above.

Conventional systems, on the other hand, would have to translate along axis 60 to withdraw unit 140 from the winding area prior to rotation. For example, if the two grippers were aligned side-by-side, they would require additional translation of unit 140 to obtain clearance before rotation could occur, thus requiring more time and potentially bottlenecking the system. Additionally, if two grippers were aligned as shown (i.e., vertically on top of each other), but were moved along a vertical axis instead of being rotated, they also would require additional translation of unit 140 backwards along axis 60 to obtain clearance before rotation could occur.

Thus, in accordance with the present invention, as soon as the core has been completely wound (i.e., all of the slots in lamination stack 156 have been wound with wire), winding unit 120 is moved slightly in direction 20 and winding unit 130 is moved slightly in opposite direction 30, just enough distance to allow the wound core to be moved in direction 40 to location 66 by holding unit 110 without hitting wire guides 124 and 134. While the wound core is moving toward location 66, load/unload unit 140 is moving in the opposite direction along axis 60 so that it also arrives at location 66. In this manner, the time prior to transfer of the wound core to load/unload unit 140 is reduced (because it takes less time for two objects in motion to meet at a location than it takes for one object to travel the entire distance to a second, stationary object). Once load/unload unit 140 and the wound core are at position 66, empty lower gripper 142 grasps the wound core.

Once the wound core has been grasped by lower gripper 142, command plate 146 is rotated one hundred eighty degrees and a new, unwound core 150 is now in alignment with axis 60, as described above. It may be preferable for load/unload unit 140 to move back from position 66 to position 64 prior to rotation (to extract shaft 152 from holding gripper 112—or, alternately, holding gripper 112 may be moved a short distance back along axis 60 to pull itself away from the wound core). If so, load/unload unit 140 is then moved back from position 64 to position 66 after rotation occurs. In either case, the grippers in holding unit 110 and load/unload unit 140 are controlled such that the unwound core is transferred from load/unload unit 140 to holding unit 110 (which is still at position 66). The control process ensures that the gripper on load/unload unit 140 does not let go of the core until the other end of the shaft has been grasped by the gripper on holding unit 110.

It should be noted that, in accordance with the present invention, load/unload unit 140 always moves between fixed points, regardless of the size of the core. The variable control of motion along axis 60 is relegated to holding unit 110 which, as described in more detail below, simplifies the process of sequentially processing different sized cores.

After gripper 112 of holding unit 110 grasps the new core, holding unit 110 is moved in direction 50 a variable distance that results in lamination stack 156 of core 150 being centered within the axes of winding flyers 122 and 132, and within the mid-point of winding guides 124 and 134. As soon as lamination stack 156 is centered, winding units 120 and 130 return to their operational positions by moving opposite to directions 20 and 30, respectively, to close around the unwound core, and the winding process can begin anew. While centering of the core is occurring, load/unload unit 140 may be depositing the wound core on a pallet (not shown), retrieving another unwound core 150 from a pallet (not shown) for winding, or it may be transferring a wound core to or from fusing device 180. In addition, empty lower gripper 142 is then realigned at position 64 to extract the next core as soon as winding is complete.

Figure 4:
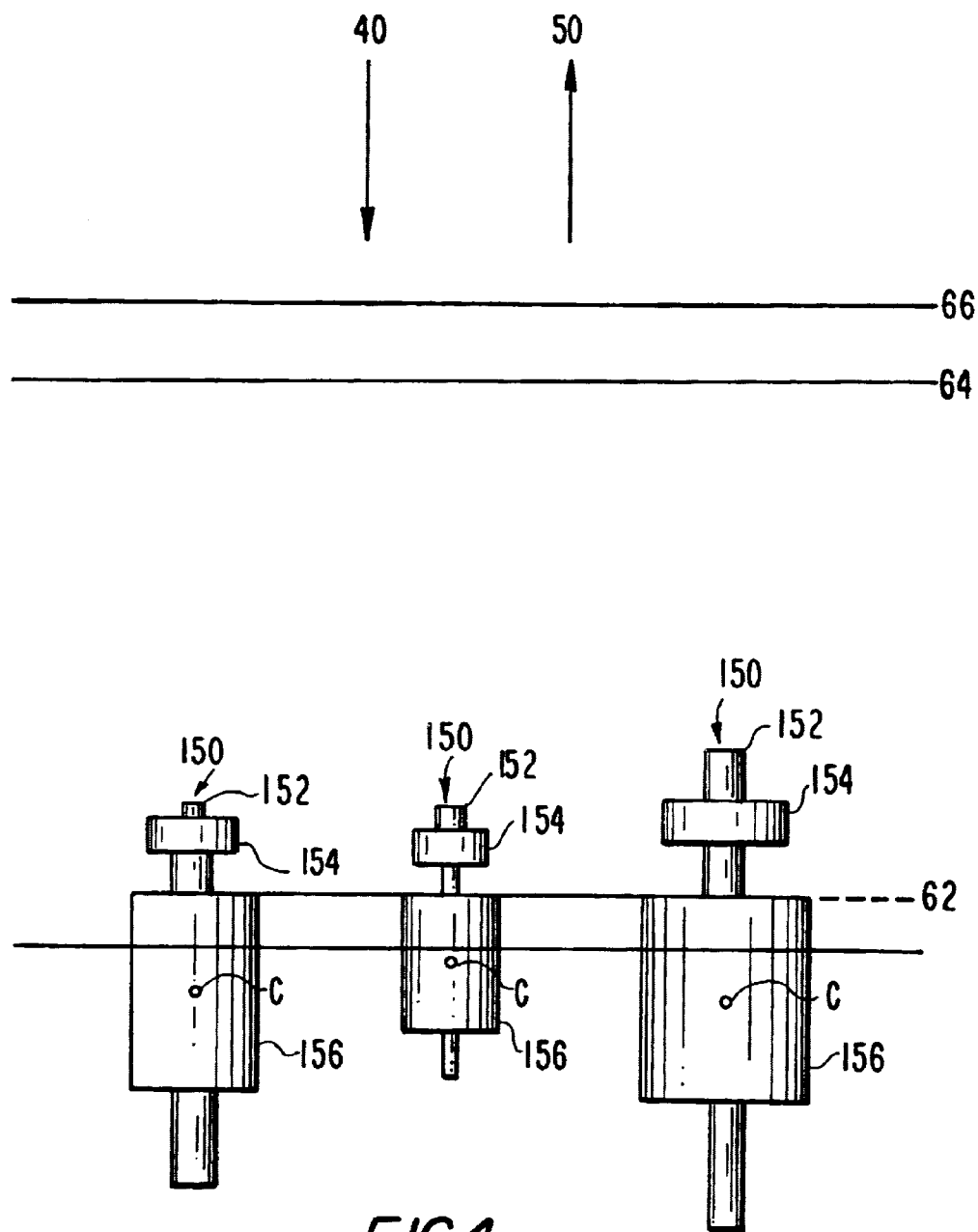
FIG. 4 is an illustration of multi-sized core processing of the core winder of FIGS. 1–3.

FIG. 4 shows a further illustration of how winding apparatus 100 may be utilized to process different size cores 150. Cores 150 are shown in FIG. 4 as they would arrive on a pallet from a conveyor system (not shown). The pallet would be aligned such that the front edge of the lamination stack (the end closest to the commutator) is aligned with position 62 as shown in FIG. 3. The pliers of gripper 142 are offset from position 62 a short distance (in the direction away from commutators 154), such that the pliers are able to grasp any sized core from the same position. The pliers are configured such that they can grasp the stack, the commutator, or even the shaft, if that is required. It may be preferred, however, for the pliers to grasp the stack, as that will aid in quickly obtaining the first index position.

Once the core is gripped by the lower gripper 142 and command plate 146 is rotated, load/unload unit 140 is moved from position 62 to position 64 in preparation for transfer of the unwound core to holding unit 110. Once winding of the previous core is complete, unit 140 need only move the short distance from position 64 to position 66 to meet with holding unit 110 to unload the processed core as described above. After unload, command plate 146 is rotated and a new unwound core 150 is transferred to holding unit 110.

Holding unit 110 is then translated along axis 60 in direction 50 a variable distance. The distance varies depending on the size of the core because each different sized core lamination stack may have a different center location "C." Holding unit 110 must align each location C so that it coincides with a center point that coincides with the center of fliers 122, 132, as well as with winding guides 124, 134 before winding can occur (i.e., holding unit 110 must align C with the center point for proper winding to occur). Units 110 and 140, however, in accordance with the principles of the present invention, may each move somewhat independently (the only time units 110 and 140 must be operated in conjunction with each other is when the actual transfer of the core takes place) to reduce waiting times.

In this manner, winding units 120 and 130 of the present invention may be operated at higher duty cycles (the amount of time out of a given period that the winders are actually winding) than in conventional winding systems. For example, a goal of such an apparatus is for the load/unload unit to always be waiting at position 64 with an empty gripper anytime the winding process is completed. This condition would result in the winders having the highest duty cycle possible (a duty cycle of 100% is not possible in such a system because some time must be spent loading and unloading the cores).

Figure 5:
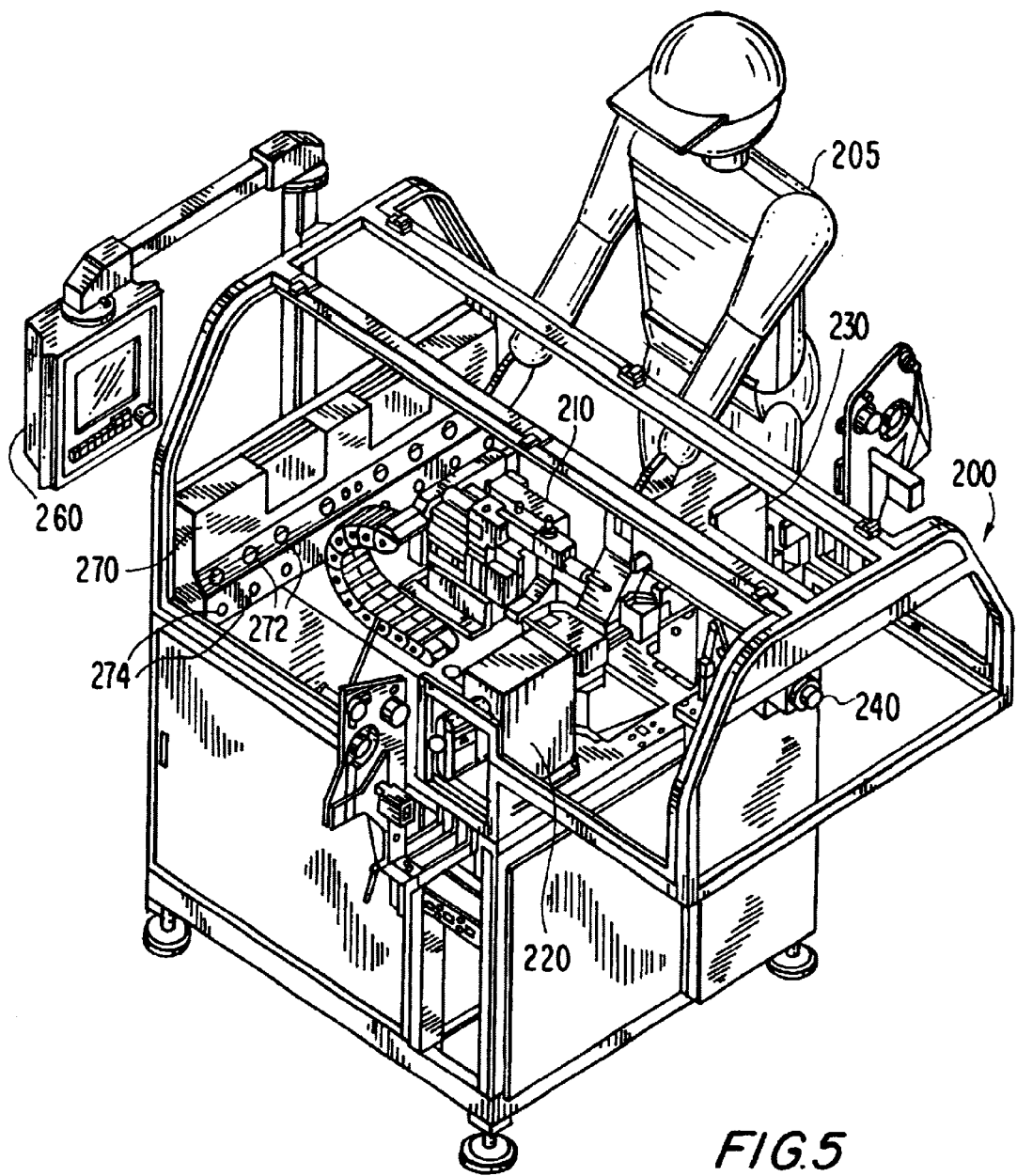
FIG. 5 is a three-dimensional illustration of an operator configuring a winding system in accordance with the principles of the present invention.

A further feature of the present invention is illustrated in FIG. 5. FIG. 5 shows a generic winding system 200 constructed in accordance with the principles of the present invention to enable an operator 205 to easily calibrate and adjust system 200 for initial operation (as well as during any preventative maintenance being performed on system 200).

System 200 may include one or more of the components described above with respect to system 100. For example, system 200 may include holding unit 210, winding units 220 and 230, and load/unload unit 240, each of which may be substantially similar to their like numbered components (e.g., holding unit 210 may be substantially identical to previously described holding unit 110). However, persons skilled in the art will appreciate that the principles set forth in connection with FIG. 5 may be applied to any winding system, such as a winding system in which core are manually loaded. Thus, many of the details shown in FIGS. 1–3 have been omitted from FIG. 5 for purposes of illustration.

System 200 also includes, in accordance with the present invention, an operators console 260 and a control panel 270. Control panel 270 is conveniently located in the back of system 200 (i.e., at the end opposite where cores are loaded and unloaded). Moreover, control panel 270 runs from end to end of apparatus 200 so that operator 205 may be provided with easy access to the control knobs and indicators that are appropriate for whichever side of apparatus 200 operator 205 is adjusting.

Control panel 270 shall, in accordance with the present invention, be configured such that control indicators 272 and control knobs 274 shall be accessible to operator 205 while operator 205 is observing and controlling the operation of system 200. For further convenience, the location of the knobs and indicators shall be oriented so that the knobs and indicators corresponding to individual components are on the same side as those components (e.g., the knob to acuate winding unit 120 shall be on one side of control panel 270, while the knob corresponding to winding unit 130 will be on the other side).

Control knobs and indicators may be used to vary and monitor, for example, air pressure, hydraulic pressure, variable resistance settings, manually activated switches, etc., that are used to configure a winding system for operation. In some instances, the operator may need to manually activate a specific drive unit or winding flyer to insure that it is operating properly. Thus, it may be preferable for panel 270 to be substantially in the same plane units 210, 220, 230, and 240, rather than being inaccessible as in conventional systems. Thus, even though control indicators 272 and control knobs 274 are only used to configure the system (and possibly for maintenance), it is preferable to have those controls be readily accessible and viewable to substantially improve the initial setup process for operator 205.

A further feature of the present invention also is apparent from FIG. 5. Control panel 270 is configured such that indicators 272 and knobs 274 are accessible by operator 205 without requiring additional conduits and/or piping to conceal and protect the wires, air lines, and hydraulic lines that are used to connect indicators 272 and knobs 274 to individual components in the winding apparatus. As configured, all of the feed lines are run to indicators 272 and knobs 274 underneath console top 280. This is contrary to conventional systems, such as that used for monitor 260, which includes external wiring conduit 262 to provide a protected pathway for the wires that provide power and signals to monitor 260.

It will be understood that the foregoing is only illustrative of the principles of the invention, and that various modifications can be made by those skilled in the art without departing from the scope and spirit of the invention.

What is claimed is:

1. Apparatus for winding wire onto a core of a dynamo-electric machine, said winding apparatus comprising:
   a winding system that winds wire around said core when said core is located at a center point;

a moveable holding unit that holds said core, comprising a first drive unit that drives said holding unit bidirectionally along a first axis and aligns said core at said center point; and a load/unload unit comprising a second drive unit that drives said load/unload unit bidirectionally along said first axis, said load/unload unit being moveable from a load position whereby said load/unload unit receives an unwound core, to a transfer position whereby said load/unload unit and said holding unit meet and said unwound core is transferred to said holding unit.

2. The apparatus of claim 1, wherein said winding system comprises first and second winding units that are moved apart from said core a minimal distance such that said holding unit and said core may move along said first axis without engaging any portion of said first and second winding units.

3. The apparatus of claim 1, wherein said holding unit moves said core, when wound, to said transfer position, said transfer position being external to said winding system.

4. The apparatus of claim 1, wherein said first drive is a variable drive and distance of movement along said first axis of said core from said transfer position to said center point varies depending on the size of said core.

5. The apparatus of claim 1, wherein said load/unload unit waits with an unwound core at an intermediate position between said load position and said transfer position.

6. The apparatus of claim 1, wherein said load/unload unit comprises:

a command plate that rotates about a second axis;
a first gripper mounted to said command plate; and
a second gripper mounted to said command plate.

7. The apparatus of claim 6, wherein said first gripper is empty and aligned along said first axis, and said second gripper grips said unwound core.

8. The apparatus of claim 6, wherein said second drive is controlled to move said load/unload unit to said transfer position, said first gripper is controlled to grasp a wound core from said holding unit, said command plate is controlled to rotate about said second axis to align said second gripper with said first axis, and said holding unit and load/unload unit are controlled to transfer said unwound core to said holding unit.

9. The apparatus of claim 6, wherein said first gripper is in a lower position and said second gripper in is an upper position, and said unwound core is in said second gripper while said load/unload unit moves to said transfer position.

10. The apparatus of claim 9, wherein said first gripper receives a wound core from said holding unit and is rotated about said second axis to said upper position.

11. The apparatus of claim 10, wherein said load/unload unit with said wound core is rotated about a third axis such that said gripper in said upper position with said wound core is in parallel with a fourth axis aligned with a fusing device.

12. The apparatus of claim 11, wherein said gripper in said lower position is aligned with said fourth axis to extract a fused core from said fusing device.

13. The apparatus of claim 1, wherein said load/unload unit comprises an upper gripper and a lower gripper, and wherein said lower gripper grasps a wound core from said holding unit after said winding system has wound said core, and wherein said load/unload unit rotates said lower and upper grippers such that said gripper holding said wound core is moved to be said upper gripper, said apparatus further comprising:

a fusing device, said load/unload unit being rotated about a second axis such that said wound core in said upper gripper is in parallel with a third axis aligned with said fusing device.

14. The apparatus of claim 1, wherein said load/unload unit comprises:

a first gripper that is empty and aligned along said first axis; and
a second gripper that grips and holds said unwound core prior to being transferred to said holding unit.

15. The apparatus of claim 1, wherein said load/unload unit comprises:

a third drive that drives said load/unload unit vertically along a second axis from said load position to a receive position where said load/unload unit receives said unwound core.

16. The apparatus of claim 15, wherein said load/unload unit further comprises:

a command plate that rotates about a third axis;
a first gripper mounted to said command plate, said first gripper being in a lower position while said third drive lowers said load/unload unit to said receive position; and
a second gripper mounted to said command plate that is rotated to said lower position prior to being aligned with said first axis and prior to said load/unload unit being moved to said transfer position.

17. The apparatus of claim 1, wherein said load/unload unit comprises a gripper that grasps said unwound core and aligns said unwound core in a first index position.

18. The apparatus of claim 17, wherein said first index position is retained when said unwound core is transferred to said holding unit.

19. The apparatus of claim 1, wherein said core comprises a lamination stack.

20. The apparatus of claim 19, wherein said load/unload unit comprises a stack gripper that grasps said stack.

21. The apparatus of claim 20, wherein said stack gripper aligns said stack in a first index position.

22. The apparatus of claim 19, wherein said holding unit comprises a holding gripper that grasps said core during transfer of cores between said holding and load/unload units.

23. The apparatus of claim 19, wherein said core is an armature core further comprising a commutator, said stack and said commutator being g fixedly mounted to a shaft.

24. The apparatus of claim 23, wherein a wound core is transferred by said load/unload unit to a fusing device that fuses wound wire to said commutator.

25. The apparatus of claim 1, wherein said holding unit and said load/unload unit simultaneously move along said first axis toward said transfer position.

26. Apparatus for winding wire onto a core of a dynamoelectric machine, said winding apparatus comprising:

a holding unit comprising a first gripper;
a winding system that winds wire on said core; and
a load/unload unit comprising at least a second gripper that grasps said core and sets said core to a first index position such that said core is in proper alignment to begin receiving said wire from said winding system and a drive unit that drives said load/unload unit along a first axis, said first and second grippers being controlled such that unwound cores having been set to said first index position are transferred from said second gripper to said first gripper while maintaining said first index position.

27. The apparatus of claim 26, wherein said apparatus further comprises:

a fusing device, said unwound cores being wound by said winding system and being transferred back to said load/unload unit while retaining said first index position, the wound cores being transferred from said load/unload unit to said fusing device while maintaining said first index position.

28. An apparatus for winding wire onto a core of a dynamo-electric machine, said winding apparatus comprising:

a load/unload unit that provides said core to be wound;

a winding system that winds wire around said core when said core is located at a center point, said winding system that is located on a first side of said load/unload unit;

a holding unit that holds said core at said center point, said holding unit that is located on said first side of said load/unload unit; and a control panel that is located on said first side of said load/unload unit, said control panel that is oriented such that an operator situated on said first side of said load/unload unit can reach and adjust control knobs on said control panel while standing and observing operation of said apparatus and control indicators on said control panel.

29. The apparatus of claim 28, further comprising:

a wiring path that provides at least wiring to said indicators and said knobs, said path being located internal to said apparatus.

30. The apparatus of claim 28, wherein said control panel is mounted to said apparatus such that it extends longitudinally along said apparatus in a direction perpendicular to the axis along which both said load/unload unit and said holding unit are located.

31. A method of winding wire onto a core of a dynamo-electric machine, said method comprising:

moving a load/unload unit along a first axis to a load position;

loading an unwound core in said load/unload unit;

moving said load/unload unit along said first axis to a transfer position;

moving a holding unit along said first axis in a first direction to said transfer position;

transferring said unwound core from said load/unload unit to said holding unit;

moving said holding unit along said first axis opposite said first direction to align said unwound core at a center point; and winding wire around said unwound core to produce a wound core.

32. The method of claim 31 further comprising:

moving first and second winding units a minimal distance apart from said wound core.

33. The method of claim 31 further comprising:

moving said holding unit along said first axis in said first direction to said transfer position without engaging a winding system that winds wire around said unwound core.

34. The method of claim 31, wherein said moving said holding unit comprises:

moving said holding unit a variable distance from said transfer position to said center point depending on the size of said core.

35. The method of claim 31, wherein moving said load/unload unit comprises:

moving said load/unload unit along said first axis from said load position to an intermediate position;

waiting until winding of a previous unwound core is complete; and moving said load/unload unit along said first axis from said intermediate position to said transfer position.

36. The method of claim 31, wherein loading comprises:

grasping said unwound core with a lower gripper; and rotating a command plate about a second axis such that a second, empty, gripper is aligned with said first axis and said lower gripper is moved into an upper position.

37. The method of claim 31, wherein transferring comprises:

grasping said wound core with a lower gripper mounted to a command plate on said load/unload unit;

rotating said command plate about a second axis to move said wound core to an upper position and to lower another unwound core to a lower position; and gripping said another unwound core with a holding gripper mounted to said holding unit.

38. The method of claim 31, further comprising:

moving said holding unit to said transfer position;

transferring said wound core from said holding unit to said load/unload unit; and rotating said load/unload unit about a second axis to align said wound core with a fusing device.

39. The method of claim 38, wherein transferring said wound core comprises:

grasping said wound core with a lower gripper mounted to a command plate on said load/unload unit; and rotating said command plate about a third axis to move said wound core to an upper position, said upper position being parallel with a fourth axis aligned with said fusing device after said rotating said load/unload unit.

40. The method of claim 31, wherein loading comprises:

lowering said load/unload unit along a second axis;

receiving said unwound core; and raising said load/unload unit along said second axis.

41. The method of claim 40, wherein loading further comprises:

rotating said unwound core about a third axis from a lower position to an upper position after said receiving occurs; and depositing a wound core located in said lower position.

42. The method of claim 31, wherein said unwound core is loaded in a first index position and said transferring comprises:

moving said unwound core from said load/unload unit to said holding unit while retaining said first index position.

43. The method of claim 31, wherein said core comprises:

a lamination stack.

44. The method of claim 43, wherein said core is an armature further comprising:

a commutator, said lamination stack and said commutator being fixedly mounted to a shaft.

45. The method of claim 43, wherein loading comprises:

grasping said lamination stack with a gripper.

46. The method of claim 45, wherein said loading further comprises:

aligning said grasped stack in a first index position.

47. The method of claim 46, wherein transferring comprises:

grasping said shaft with a holding gripper on said holding unit while retaining said first index position.

48. A method of winding wire onto a core of a dynamo-electric machine, said method comprising:

moving a load/unload unit along a first axis to a load position;

loading an unwound core in said load/unload unit;

aligning said unwound core to a first index position;

moving said load/unload unit along said first axis to a transfer position;

transferring said unwound core from said load/unload unit to said holding unit while retaining said first index position; and winding wire around said unwound core to produce a wound core.

* * * * *